United States Patent
Zhang et al.

(10) Patent No.: US 12,109,777 B1
(45) Date of Patent: Oct. 8, 2024

(54) ACID FRACTURING HOSE AND PREPARATION METHOD THEREOF

(71) Applicant: QINGDAO QINGFLEX HOSE FACTORY, Shandong (CN)

(72) Inventors: Chen Zhang, Qingdao (CN); Yanqiu Wang, Qingdao (CN); Fan Zhou, Qingdao (CN)

(73) Assignee: QINGDAO QINGFLEX HOSE FACTORY, Shandong (CN)

( * ) Notice: Subject to any disclaimer, the term of this patent is extended or adjusted under 35 U.S.C. 154(b) by 0 days.

(21) Appl. No.: 18/699,367

(22) PCT Filed: Jun. 5, 2023

(86) PCT No.: PCT/CN2023/098364
§ 371 (c)(1),
(2) Date: Apr. 8, 2024

(30) Foreign Application Priority Data

Apr. 4, 2023 (CN) .......................... 202320726671.0
May 30, 2023 (CN) .......................... 202310631791.7

(51) Int. Cl.
| | |
|---|---|
| B32B 15/02 | (2006.01) |
| B32B 1/08 | (2006.01) |
| B32B 25/08 | (2006.01) |
| B32B 25/10 | (2006.01) |
| B32B 25/14 | (2006.01) |

(Continued)

(52) U.S. Cl.
CPC ................ *B32B 15/02* (2013.01); *B32B 1/08* (2013.01); *B32B 25/08* (2013.01); *B32B 25/10* (2013.01); *B32B 25/14* (2013.01); *B32B 37/06* (2013.01); *E21B 17/20* (2013.01); *B32B 2250/05* (2013.01); *B32B 2250/40* (2013.01); *B32B 2305/08* (2013.01); *B32B 2311/30* (2013.01); *B32B 2319/00* (2013.01); *B32B 2597/00* (2013.01); *E21B 43/27* (2020.05)

(58) Field of Classification Search
None
See application file for complete search history.

(56) References Cited

FOREIGN PATENT DOCUMENTS

| | | |
|---|---|---|
| CN | 102865420 A | 1/2013 |
| CN | 103470875 A | 12/2013 |

(Continued)

OTHER PUBLICATIONS

Dec. 25, 2023 International Search Report issued in International Patent Application No. PCT/CN2023/098364.

(Continued)

*Primary Examiner* — James C Yager
(74) *Attorney, Agent, or Firm* — Oliff PLC

(57) ABSTRACT

An acid fracturing hose and a preparation method thereof, wherein, the acid fracturing hose includes an inner liner layer, an inner rubber layer, a first buffer layer, a reinforcing layer, a second buffer layer and an outer rubber layer from inside to out in sequence; wherein the inner liner layer is at least one layer of UHMWPE film, the reinforcing layer includes middle rubber layers and steel wire layers that are arranged at intervals, the inner rubber layer and the outer rubber layer are synthetic rubber, and the first buffer layer, the middle rubber layers and the second buffer layer are kiss-coating cord fabrics. The UHMWPE film is used as an inner liner layer, which can be integrated with an inner rubber layer and an outer rubber layer through a high temperature vulcanization process, and the inner liner layer is taken as an inner wall of the hose.

8 Claims, 1 Drawing Sheet

(51) Int. Cl.
  *B32B 37/06* (2006.01)
  *E21B 17/20* (2006.01)
  *E21B 43/27* (2006.01)

(56) References Cited

FOREIGN PATENT DOCUMENTS

| CN | 103899855 A | 7/2014 |
| CN | 203685152 U | 7/2014 |
| CN | 103965554 A | 8/2014 |
| CN | 104086906 A | 10/2014 |
| CN | 105042220 A | 11/2015 |
| CN | 105065803 A | 11/2015 |
| CN | 105131353 A | 12/2015 |
| CN | 205036986 U | 2/2016 |
| CN | 105400023 A | 3/2016 |
| CN | 106151705 A | 11/2016 |
| CN | 206846122 U | 1/2018 |
| CN | 107990059 A | 5/2018 |
| CN | 108642930 A | 10/2018 |
| CN | 108662307 A | 10/2018 |
| CN | 109454842 A | 3/2019 |
| CN | 208886167 U | 5/2019 |
| CN | 109971048 A | 7/2019 |
| CN | 110805758 A | 2/2020 |
| CN | 112679806 A | 4/2021 |
| CN | 113442514 A | 9/2021 |
| EP | 0 333 370 A1 | 9/1989 |
| WO | 2018/000754 A1 | 1/2018 |

OTHER PUBLICATIONS

Dec. 25, 2023 Written Opinion issued in International Patent Application No. PCT/CN2023/098364.
Dec. 28, 2023 Office Action issued in Chinese Patent Application No. 202310631791.7.
"Rubber Industry Manual vol. 5", Beijing Petrochemical Industry Press, Nov. 30, 1975.
"Steel wire for rubber hose reinforcement", GB/T11182-2017, Dec. 31, 2017.
Cao et al., "Construction and improvement suggestions for cold-rolled twisted steel reinforced concrete components", Construction Worker, Oct. 15, 2006.

ACID FRACTURING HOSE AND PREPARATION METHOD THEREOF

This application claims priority benefit of a Chinese application no. 202310631791.7, entitled "an acid fracturing hose and a preparation method thereof", filed with the China National Intellectual Property Administration on May 30, 2023, and claims priority benefit of a Chinese application no. 202320726671.0, entitled "a structure of a novel acid fracturing hose", filed with the China National Intellectual Property Administration on Apr. 4, 2023. The entire contents of each of which are incorporated herein by reference.

TECHNICAL FIELD

The present invention belongs to the technical field of acid fracturing string, and particularly relates to an acid fracturing hose and a preparation method thereof.

BACKGROUND

The statements in this section merely provide background information related to the present invention and are not necessarily prior art.

The surge in oil demand is forcing new changes in oilfield technology. Fracture acidizing is mainly used for oil and gas wells with deep plugging range or low permeability zone. The fracture acidizing with acid injection pressure higher than oil (gas) formation fracture pressure is customarily called acid fracturing. It is widely used in limestone reservoirs of oil fields at home and abroad as a stimulation measure to increase production and injection. It has now become an important means of well completion. The acid fracturing plays a significant role in production growth of the oil field in the process of oil field production, and it has been widely used in the current oil extraction process in China.

Acid fracturing string, as the main load-bearing component in acid fracturing technology, plays an important role in acid fracturing technology, and a transmission medium therein is an acid-based fracturing fluid. The currently adopted acid fracturing string is of a steel pipe, for example, Chinese patent No. CN203685152U discloses a fracture acidizing process string for oil and gas wells, which uses steel pipe as fracturing pipeline, but due to the limitation of its own material, the steel pipe and metal pipe joint have the defects of large weight, inflexible, troublesome handling and disassembly, and the service life of the movable elbow of the steel pipe is only about 500 hours, and the replacement cost is high. Meanwhile, in the fracturing process, a large amount of liquid medium transported under high pressure will cause vibration of the pipeline, which will lead to vibration fatigue of the whole steel pipeline. Due to the limitation of hard pipe, fractured steel pipe joints are numerous, and flaw detection is required every 200 hours, which has a negative impact on fracturing engineering efficiency. Therefore, steel pipe has the disadvantages of high cost, non-bending, difficult assembly and short service life.

SUMMARY

It is an object of the present invention to provide an acid fracturing hose, by replacing steel pipes with hoses, costs can be significantly reduced, and the hoses are acid resistant, super wear-resistant, resistant to ultra-high pressure, light-weight, have a long service life, which are more convenient to assemble than steel pipes.

In order to achieve the above object, the present invention is achieved through the following technical solution:

an acid fracturing hose, including, sequentially from inside to outside, an inner liner layer, an inner rubber layer, a first buffer layer, a reinforcing layer, a second buffer layer and an outer rubber layer; wherein the inner liner layer is at least one layer of ultra-high molecular weight polyethylene (UHMWPE) film, the reinforcing layer includes a plurality of middle rubber layers and a plurality of steel wire layers that are arranged at intervals, the inner rubber layer and the outer rubber layer are synthetic rubber, and the first buffer layer, the plurality of middle rubber layers and the second buffer layer are kiss-coating cord fabrics.

Preferably, the reinforcing layer includes the plurality of steel wire layers, the plurality of steel wire layers include a plurality of steel wire inner layers and a plurality of steel wire outer layers; in the hose, a diameter and a strength of a steel wire of each of the plurality of steel wire inner layers are lower than those of a steel wire of each of the plurality of steel wire outer layers, respectively, and an elongation of the steel wire of the each of the plurality of steel wire inner layers is higher than that of the steel wire of the each of the plurality of steel wire outer layers.

Preferably, the strength of the steel wire of the each of the plurality of steel wire inner layers is 1630-2150 MPa and the elongation of which is not less than 5%; the strength of the steel wire of the each of the plurality of steel wire outer layers is 2150-2750 MPa and the elongation of which is not less than 1.6%.

Preferably, the plurality of steel wire inner layers has 2-6 layers and the plurality of steel wire outer layers has 4-10 layers.

Preferably, a winding direction of the steel wires in two adjacent steel wire layers is opposite, and a winding angle of the steel wires in the plurality of the steel wire layers increase sequentially from inside to outside.

Preferably, a formula of the inner rubber layer, counting in part by weight, includes: 30 parts of natural rubber, 20 parts of styrene butadiene rubber, 50 parts of cis-polybutadiene, 20-30 parts of carbon black 234, 30-40 parts of carbon black 330, 4-6 parts of zinc oxide (activator), 1-2 parts of stearic acid (activator), 4-8 parts of antioxidant, 5-10 parts of graphite, 5-10 parts of mica powder, 3-5 parts of adhesive CL-20, 3-6 parts of tackifier, 1.5-3 parts of vulcanizing agent, and 2-3 parts of accelerator.

Preferably, the antioxidant is one or a combination of more than two of 1,2-Dihydro-2,2,4-trimethylquinoline polymer and N-isopropyl-N'-phenylenediamine; the vulcanizing agent is sulfur; and the accelerator is one or a combination of more than two of N-cyclohexylbenzothiazole-2-sulphenamide, N-tert-butylbenzothiazole-2-sulphenamide, 2,2'-Dibenzothiazole disulfide, and 4,4'-dithiodimorpholine.

Preferably, a formula of the outer rubber layer, counting in part by weight, includes: 80 parts of chloroprene rubber, 20 parts of PVC, 3-6 parts of zinc oxide, 3-6 parts of magnesium oxide, 0.5-2 parts of stearic acid, 2-3 parts of antioxidant, 30-40 parts of carbon black 330, 20-30 parts of carbon black 550, 0.5-1.5 parts of sulfur, 0.3-1.5 parts of accelerator NA-22, 0.5-1.5 parts of the accelerator DM, 15-30 parts of dioctyl phthalate, 0.3-1.5 parts of anti-scorching agent, and 1-3 parts of stabilizer.

Preferably, the anti-scorching agent is N-cyclohexylthiophthalimide; and the stabilizer is calcium zinc stabilizer.

The present invention further provides a preparation method of the acid fracturing hose mentioned above, the preparation method includes the following steps: coating the UHMWPE film in a spiral wrapping manner, and then performing hot melting to form the inner liner layer; sequentially wrapping the inner rubber layer, the first buffer layer, the reinforcing layer, the second buffer layer and the outer rubber layer.

The advantageous effects of the embodiments of the present invention described above are as follows:

1. According to the acid fracturing hose provided by the present invention, a steel pipe is replaced by the hose, the cost can be greatly reduced, and the hose is acid resistant, super wear-resistant, ultra-high pressure resistant, light in weight, long in service life and more convenient to assemble than the steel pipe. According to the acid fracturing hose provided by the present invention, an UHMWPE film is used as an inner liner layer and an outer coating layer, and can be integrated with an inner rubber layer and an outer rubber layer through a high temperature vulcanization process, wherein the inner liner layer is taken as an inner wall of the hose, which can greatly improve the wear resistance, acid and alkali resistance and the like of the product, and prolong the service life of the product; and, the outer coating layer is taken as an outer wall of the hose, which can protect the hose body, and further prolong the service life of the hose.
2. According to the acid fracturing hose provided by the present invention, providing with a plurality of middle rubber layers and a plurality of steel wire layers, wherein the plurality of middle rubber layers and the plurality of steel wire layers are arranged at intervals, namely, a steel wire layer is arranged between every two layers of middle rubber layers, the plurality of steel wire layers are made of high-strength steel wires and steel wire ropes, the plurality of middle rubber layers, which are synthetic rubber, play an adhesion role to adhere the steel wire layers a whole, which improves the strength of the hose, and makes the hose have better compression resistance.
3. According to the acid fracturing hose provided by the present invention, through the arrangement of the first buffer layer, the intermediate buffer layer and the first buffer layer, during production, the acid fracturing hose can be wound and coated with larger tension, which can reduce tension difference between different steel wires (ropes), improve strength utilization rate of a single steel wires (ropes), and make the explosion pressure of a product is higher. Moreover, the condition of partial incomplete coating does not occur, which can improve the stability of the product. When cutting the hose, the steel wires (ropes) are still a whole under the wrapping effect of each layer of cord fabric, and will not head-blowing and will not affect the assembly. In use, the hose can isolate pulse vibration well, buffer the impact of pressure on the reinforced layer, and is not easy to be worn through, greatly improving the service life of the product.
4. According to the present invention, the steel wire inner layer is made of steel wires with low strength and high elongation; the steel wire outer layer is made of steel wires with high strength and low elongation; when the hose body expands under pressure, the steel wires of the steel wire inner layers are expanded when the steel wires are pressed, the pressure is sequentially transmitted outwards from the first layer, so that the pressure is transmitted layer by layer to the outer layer, improving the strength utilization rate of the steel wires of the steel wire outer layers, fully exerting the effect of each layer of the steel wires, and preventing an occurrence of the problem that the steel wires of the steel wire inner layers are broken before the steel wires of the steel wire outer layers are pressed.
5. According to the present invention, mica powder is introduced into the formula of the inner rubber of the acid fracturing hose, and the acid resistance of the inner rubber can be greatly improved due to the excellent barrier effect of mica powder. The application of mica powder and graphite makes the wear resistance and acid corrosion resistance of the inner rubber far superior to traditional rubber materials, and the overall service life of rubber hose is greatly improved. According to the design of the formula of the inner rubber layer, the adhesion between the inner rubber layer and the inner liner layer does not need pre-vulcanization, and after the inner liner layer is hot melted, the inner rubber layer and the inner liner layer can be adhered well through one-time vulcanization, so that the production efficiency is improved, and the energy consumption is reduced.

Advantages of additional aspects of the invention will be set forth in the following description, and in part will become apparent from the following description, or may be learned by practice of the invention.

In order to make the above objects, features and advantages of the present invention more apparent, preferred embodiments are described in detail below with reference to the accompanying drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

The schematic diagrams are for illustrative purposes only; wherein, 1—inner liner layer, 2—inner rubber layer, 3—first buffer layer, 4—middle rubber layer, 5—steel wire layer, 6—second buffer layer, 7—outer rubber layer, 8—outer coating layer, 9—film wrapping machine, 10—hot melt machine, 11—air cooling machine, 12—traction machine;

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

Figure 1:
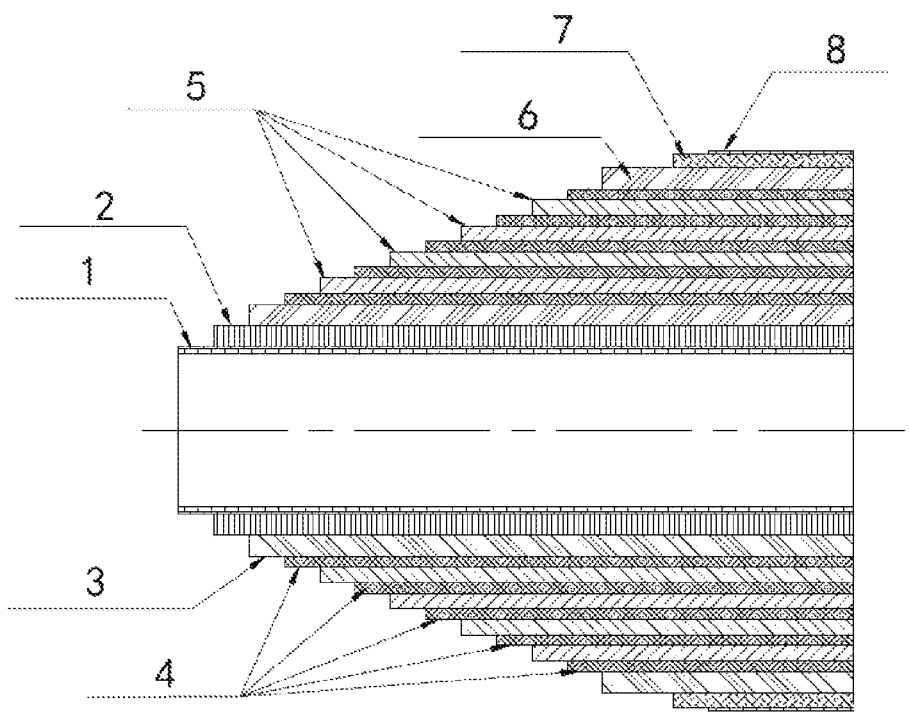
FIG. 1 is a schematic diagram of an acid fracturing hose of the present invention.

In a typical embodiment of the present invention, as shown in FIG. 1, providing an acid fracturing hose, including, sequentially from inside to outside, an inner liner layer 1, an inner rubber layer 2, a first buffer layer 3, a reinforcing layer, a second buffer layer 6, and an outer rubber layer 7; wherein the inner liner layer 1 is at least one layer of UHMWPE film, the reinforcing layer includes middle rubber layers 4 and steel wire layers 5 that are arranged at intervals in multiple layers, the inner rubber layer 2 and the outer rubber layer 7 are synthetic rubber, and the first buffer layer 3, the middle rubber layers 4 and the second buffer layer 6 are all kiss-coating cord fabrics.

Specifically, the inner liner layer 1 and the outer coating layer 8 are formed by wrapping UHMWPE films, wherein the inner liner layer 1 is formed by spirally wrapping 1-16 layers of the UHMWPE film, and a specific number of wrapping layers can be set according to requirements. The molecular weight of UHMWPE is about 5 million to 9 million, which makes it have better performance than ordinary polyethylene in various technical parameters, and it has excellent wear resistance and impact resistance, excellent chemical corrosion resistance, stress cracking resistance, low sliding friction coefficient and stable performance over long periods of time, etc.; using the UHMWPE film as the inner wall of the rubber hose can greatly improve the wear resistance, acid and alkali resistance and other properties of the product, and improve the service life of the product. In addition, the UHMWPE film can be integrated with the inner rubber layer 2 through the high temperature process of the vulcanization.

The outer coating layer 8 is formed by spirally wrapping one layer of the UHMWPE film, a lap width is more than ½ of the film width; the outer coating layer 8 serves as a protective layer, to protect the pipe body by wrapping the UHMWPE film outside the hose, which prolongs the service life of the hose.

The first buffer layer 3, the middle rubber layer 4 and the second buffer layer 6 are formed by using kiss-coating cord fabrics, wherein the first buffer layer 3 is formed by wrapping 2-8 layers of the kiss-coating cord fabrics to buffer the damage of the steel wire layer 5 to the inner rubber layer 2; the second buffer layer 6 is formed by wrapping 2-6 layers of the kiss-coating cord fabrics to protect the steel wire layer 5. The cord fabrics is a kind of fiber cloth layer made by pressing, by a four-roll calendar, natural styrene-butadiene rubber onto a cloth made by weaving thick and high strength cord as warp yarn and thin and low strength cord as weft yarn through four-roll calendar pressing natural styrene-butadiene rubber.

The conventional hose comprises, from inside to outside, an inner rubber layer 2, a reinforcing layer and an outer rubber layer 7, wherein the reinforcing layer has a plurality of layers of steel wires or steel wire ropes, and the plurality of layers of steel wires adopt raw rubber as an adhesive layer to bond the steel wires into a whole. The structure of the conventional hose has the following issues:
  i) In production, the middle rubber layer has no skeleton structure, and the strength is low. And, during the production, the middle rubber layer is a raw rubber (an unvulcanized rubber, rubber vulcanizing agent PDM). When wrapping coating, it is easy to be stretched after stress, narrowing and thinning. Therefore, the coating is only be carried out with a small tension, which cannot play a role in bundling and wrapping the lower steel wire, thus unable to alleviate the tension difference between different steel wires, and thus unable to fully utilize the role of each steel wire. At the same time, it also causes insufficient width or thickness of the rubber materials between the steel wire layers, resulting in direct contact between the steel wires, greatly affecting their service life. Moreover, due to the loose coating of the middle rubber layer, when wrapping the outer layer of steel wire, it is easy to push up the middle rubber layer or inner rubber layer below, forming wrinkles or partial incomplete coverage.
  ii) Due to the insufficient wrapping force provided by the middle rubber layer, during cutting, the end face of steel wires is prone to head-blowing due to the heat generated by the friction of the grinding wheel and damage caused by the grinding wheel (the head-blowing refers to a blowing of steel wires at the end face thereof, rather than a whole, and the outer diameter size of the end face is much larger than the size of the rubber hose itself), resulting in the inability to assemble . . .
  iii) When in use, due to the high-pressure pulse effect on the hose, the middle rubber layer is easily worn through, causing the steel wires to directly contact and rub against each other, leading to wear and breakage, resulting in hose burst and leakage, shortening the service life, and posing significant safety hazards.

These problems will affect the quality and service life of the product, and there are safety hazards. By arranging the first buffer layer, the intermediate buffer layer and the second buffer layer, compared with the prior art, the invention has the following advantages:
  i) During production, due to the increase of the hanging rubber cord cloth containing the cord cloth, it can be wrapped with a larger tension for coating during production, which can reduce the tension difference between different steel wires (ropes), improve the strength utilization rate of a single steel wire (rope), and the coated product structure is more compact, each steel wire can play its role to a greater extent, resulting in higher bursting pressure and longer service life of the product. Moreover, the hanging rubber cord cloth is not easy to deform when stressed, so it will not cause width and thickness changes due to deformation during coating, and there will be no partial incomplete coating, which improves product stability; at the same time, it will not strangle the inner tube when using larger tension molding; in addition, due to the larger coating tension, the structure is more compact, so when wrapping a layer of steel wire (rope), the rubber layer will not be easily pushed up.
  ii) When cutting, the steel wire (rope) is still a whole under the wrapping effect of each layer of cord fabric, and will not head-blowing and will not affect the assembly.
  iii) When in use, due to the cord fabric as the skeleton, the steel wire (rope) does not directly contact the inner rubber layer 2, avoiding the inner rubber layer 2 to penetrate in the use process, greatly improving the quality stability of the product; between the steel wire layers, the cord fabric can effectively isolate pulse vibration, buffer the impact of pressure on the reinforcement layer 4, and has fibers as the skeleton, which is not easily worn through and can greatly improve the product life.

Further:

The reinforcing layer is provided with a plurality of steel wire layers which are divided into a steel wire inner layer and a steel wire outer layer; in a hose, the diameter and the strength of the steel wires of the steel wire inner layer are lower than those of the steel wires of the steel wire outer layer respectively; and the elongation of the steel wires of the steel wire inner layer is higher than that of the steel wires of the steel wire outer layer. Specifically, the strength of the steel wires of the steel wire inner layer is 1630-2150 MPa, and the elongation thereof is not less than 5%; and the strength of the steel wire of the steel wire outer layer is 2150-2750 MPa, and the elongation thereof is not less than 1.6%. The steel wire inner layer has 2-6 layers, and the steel wire outer layer has 4-10 layers. The specific number of layers of the steel wire inner layer and the steel wire outer layer can be set according to the pressure requirement. For example: a hose with 6 layers of steel wire in the reinforcement layer, wherein the first and the second layers are the steel wire inner layers, the rests are steel wire outer layers; a hose with 10 layers of steel wire in the reinforcement layer, wherein the first to fourth layers are the steel wire inner layers, the rests are steel wire outer layers.

Traditional methods only focus on improving the strength and diameter of steel wires in order to increase the burst pressure of rubber hoses. In the present invention, the steel wire adopts a combination of thickness, high and low strength, and high and low elongation. Specifically, according to the present invention, the steel wire inner layer is made by bead steel wire that has low strength and high elongation, and the surface of the steel wire is coated with low tin bronze or high tin bronze, resulting in high fracture elongation; the steel wire outer layer is made of high-strength copper plated steel wire, which has high strength and low elongation. When the hose body expands under pressure, the steel wires of the steel wire inner layers are expanded when the steel wires are pressed, the pressure is sequentially transmitted outwards from the first layer, so that the pressure is transmitted layer by layer to the outer layer, improving the strength utilization rate of the steel wires of the steel wire outer layers, fully exerting the effect of each layer of the steel wires, and preventing an occurrence of the problem that the steel wires of the steel wire inner layers are broken before the steel wires of the steel wire outer layers are pressed.

Still further:

In traditional hoses, all the steel wire layers are wound at a balance angle of 54.73°, which cannot fully exert the compressive performance of each layer of steel wire. This is because when the inner layer of steel wire is wound at the angle of 54.73°, the pressure has reached the balance angle and will no longer continue to expand to transfer pressure to the outer layer of the steel wire, it quickly reaches the pressure limit of the inner layer of steel wire and bursts, but the outer layer of steel wire does not play a role, so the burst pressure of this type of hose is lower. In the present invention, the values of the winding angles of the multi-layer steel wire layers increase sequentially from the inside out. By using different combinations of winding angles, it is possible to balance the axial torsional force of the steel wires between different layers when the rubber hose is compressed, as well as the axial elongation and shortening force. Therefore, different winding angles combined with the setting of the inner and outer layers of the steel wires greatly improve the burst pressure of the hose.

Still further:

The inner liner layer of the acid fracturing hose first comes into contact with the conveying medium, and when it is used to a certain extent, the inner liner layer is worn through, causing the inner rubber layer to come into contact with the conveying medium. Due to the special nature of the medium conveyed by the hose, the inner rubber layer should have high wear resistance, acid corrosion resistance, and good adhesion with the inner lining layer to avoid delamination, improve compression, and prevent detachment after compression. Moreover, in previous methods, the inner layer was semi vulcanized (or pre vulcanized) and coated with adhesive. In the past, due to the unsatisfactory performance of the formula, only semi vulcanization was used to fuse the rubber with the inner liner layer. However, after the semi vulcanization, the vulcanization system in the formula has participated in the reaction, and the remaining amount of the vulcanization system is not enough to bond with the middle rubber layer outside, so it is necessary to apply adhesive again. This operation method adds multiple steps such as wrapping, semi vulcanizing, unraveling, applying adhesive, and drying, which require more time, specialized equipment, and operating space to complete and consume steam energy.

Based on this, the inner rubber layer of the present invention adopts diene rubber, which comprises one or a combination of natural rubber, styrene butadiene rubber, neoprene rubber, cis-polybutadiene, nitrile rubber and the like, and can be integrated with the UHMWPE film of the liner through a final vulcanization process through a large number of experiments, formula design optimization and addition of special adhesive. And on this basis, special materials including but not limited to mica powder, graphite and the like can be added, and one or more of them can be used in combination to improve the wear resistance and acid corrosion resistance of the inner rubber.

Wherein, mica powder cannot only reduce the friction coefficient and reduce rubber wear, thus improving the service life of rubber materials, but also can improve the size stability, stress cracking resistance, toughness, aging resistance and cracking resistance of the product, endow the product with excellent acid and alkali resistance, flame retardance and corrosion resistance, improve the heat resistance of the product, reduce shrinkage and the like.

Graphite is an allotrope of carbon, gray black, opaque solid, with a small thermal expansion rate, good self-lubricating properties, high and low temperature resistance, thermal shock resistance (small volume change rate when temperature changes, not easy to crack), radiation resistance, stable chemical properties (except oxidizing agents, not subject to any acid, alkali and organic solvent corrosion). It has significant effect on high temperature resistance, wear resistance, acid and alkali resistance and strength performance of rubber materials.

A formula of the inner rubber layer comprises the following components in part by weight: 30 parts of natural rubber, 20 parts of styrene butadiene rubber, 50 parts of cis-polybutadiene, 20-30 parts of carbon black 234, 30-40 parts of carbon black 330, 4-6 parts of activator zinc oxide, 1-2 parts of activator stearic acid, 4-8 parts of antioxidant, 5-10 parts of graphite, 5-10 parts of mica powder, 3-5 parts of adhesive CL-20 (a modified non-self-curing phenolic resin), 3-6 parts of tackifier RX-80 (a petroleum tackifying resin), 1.5-3 parts of vulcanizing agent and 2-3 parts of accelerator. Wherein, the antioxidant is one or a combination of more than two of RD (chemical name: 1,2-Dihydro-2,2, 4-trimethylquinoline polymer) and 4010NA (chemical name: N-isopropyl-N'-phenylenediamine); the vulcanizing agent is sulfur; and the accelerator is one or a combination of more than two CZ of (chemical name: N-cyclohexylbenzothiazole-2-sulphenamide), NS (chemical name: N-tert-butylbenzothiazole-2-sulphenamide), DM (chemical name: 2,2'-Dibenzothiazole disulfide) and DTDM (chemical name: 4,4'-dithiodimorpholine).

According to the present invention, the mica powder is introduced into the formula of the inner rubber of the acid fracturing hose, and the acid resistance of the inner rubber can be greatly improved due to the excellent barrier effect of mica powder. The application of the mica powder and the graphite makes the wear resistance and acid corrosion resistance far superior to traditional rubber materials, and the overall service life of rubber hose is greatly improved.

Through formula design, the adhesion of the inner rubber layer and the inner liner layer does not need pre-vulcanization, and after the inner liner layer is hot melted, the inner rubber layer and the inner liner layer can be adhered well through one-time vulcanization, so that the production efficiency is improved and the energy consumption is reduced.

Still further:

The outer rubber of acid fracturing hose is exposed to various harsh natural environments due to harsh service conditions, and is eroded by ultraviolet rays, light, seawater, oil and acidic media for a long time. Therefore, aging resistance, acid and alkali resistance, flame retardant, wear resistance and other characteristics are required. Based on this, the present invention proposes the use of chloroprene rubber (CR) and PVC in combination for the outer rubber of the acid fracturing hose, and the outer rubber is endowed with more excellent comprehensive properties such as aging resistance, abrasion resistance, acid resistance, oil resistance and the like through the design and optimization of a formula. Considering the combination of chloroprene rubber and PVC, it gives the outer rubber better wear resistance, aging resistance, acid resistance and flame retardant performance, has better processing performance than traditional chloroprene rubber, and during extrusion, the rubber material is not easily burnt and has low loss. Chloroprene rubber used alone has poor processing technology in rubber mixing, easy scorch in extrusion, poor wear resistance and high cost.

A formula of the outer rubber lay comprises following components in part by weight: 80 parts of chloroprene rubber, 20 parts of PVC (polyvinyl chloride), 3-6 parts of zinc oxide, 3-6 parts of magnesium oxide, 0.5-2 parts of stearic acid, 2-3 parts of antioxidant, 30-40 parts of carbon black 330, 20-30 parts of carbon black 550, 0.5-1.5 parts of sulfur, 0.3-1.5 parts of accelerator NA-22 (chemical name: 1,2-ethylene thiourea), 0.5-1.5 parts of accelerator DM (chemical name: 2,2'-Dibenzothiazole disulfide), 15-30 parts of DOP (chemical name: dioctyl phthalate), 0.3-1.5 parts of anti-scorching agent and 1-3 parts of stabilizer. Wherein, the antioxidant is ODA (chemical name: 4,4'-dioctyl diphenylamine) or combined with other antioxidants; the anti-scorching agent is CTP (chemical name: N-cyclohexylthiophthalimide); and the stabilizer is calcium zinc stabilizer.

A preparation method of the acid fracturing hose comprises the following steps:

Preparing kiss-coating cord fabric: selecting cord fabric with appropriate thickness according to different production specifications, and performance requirements of a kiss-coating formula of the cord fabric are: good fluidity, good adhesion with cord fabric and steel wire rope, high strength, good fatigue resistance and the like; pressing the rubber material onto the cord fabric through a calendar, wherein both sides of the cord fabric are coated with the rubber material; attaching a layer of plastic film below after coating, and then wrapping into a roll, wherein, the plastic film is to isolate the coated cord fabric after rolling, to prevent mutual adhesion after rolling, thus affecting the use; according to the production specification, cutting the kiss-coating cord fabric into the required width, and rolled up together with the plastic film to a wrapping fixture for standby after being rolled up.

S1, pretreating: applying a layer of release agent evenly on a steel mandrel so that the mandrel can be easily removed after vulcanization.

S2, wrapping the inner liner layer: wrapping UHMWPE film with thickness of 0.05-0.20 mm on the mandrel with a film wrapping machine, overlapping width of ½-¾, can be wound 1-20 layers according to requirements. The inner liner layer is formed through wrapping, hot melt, air cooling molding.

Figure 2:
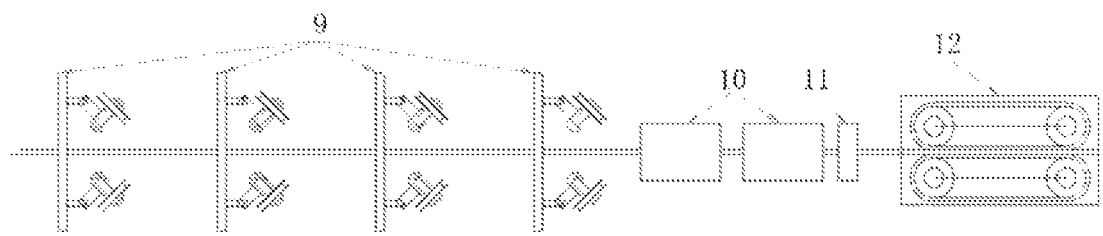
FIG. 2 is a schematic view of wrapping an inner layer of the present invention.

The UHMWPE film of the inner liner is produced by using a film wrapping machine 9 and a hot melt machine 10, and as shown in FIG. 2, 16 layers can be wrapped at the same time, and the film is melted into a whole by the hot melt machine. Wherein, a fusion effect of the film is good and it does not need a pre-vulcanization by matching with a high adhesion of the inner rubber layer, and the production can be linked with an extruder, which greatly improves the production efficiency. Moreover, a wall thickness of the inner liner layer is uniform and stable, and there is no eccentricity.

As shown in FIG. 2, the film wrapping machine 9 is equipped with four large plates, each the large plate is provided with 4 brackets configured to mount one roll of the PE film on the large plate, so four rolls of the PE film can be mounted on the film wrapping machine 9 at the same time. When the large plate rotates, traction is started at the same time to wrap the PE film on the mandrel. After the wrapping is completed, the mandrel with wound PE film is put into two equipped high temperature hot melt machines 10 for melting the PE film into a whole, then an air cooler 11 is used to cool the PE film melted into a whole. Wherein, the traction of a traction machine 12 is controlled by a servo control, linkages with the rotation of the large plates, and a pitch for each layer of the PE film is input from a control cabinet. After the wrapping of the PE film is completed, an inner rubber material is extruded to complete of the wrapping of the inner liner layer and an extrusion of the inner rubber layer at one time.

S3, wrapping the inner rubber layer: extruding a synthetic rubber or a natural rubber inner rubber layer with a thickness of 3-6 mm on the mandrel wrapped with the UHMWPE film, wherein the synthetic rubber can be nitrile rubber, styrene butadiene rubber, ethylene propylene diene rubber, rubber plastic alloy, chlorinated polyethylene, etc.;

S4, wrapping the first buffer layer: wrapping and coating the kiss-coating cord fabric to an outside of the inner rubber layer, adjusting a wrapping angle and tension, so that the kiss-coating cord fabric can be evenly coated without edge wrap and flash seam, and setting a lap width is 1-3 mm to form the first buffer layer. The inner rubber layer is protected by wrapping a mesh cloth with 0.3-0.5 mm thick or the cord fabric with 0.7-1.0 mm outside a tube embryo of the inner rubber, so as to avoid the inner rubber from being damaged when steel wires are wound, and improve the quality stability of the product.

S4, wrapping the reinforcing layer: adjusting a pitch of the steel wire and a gap between the steel wires, wrapping angle and tension, and winding the first layer of the steel wire to obtain the first layer of steel wire layer, wrapping and coating the kiss-coating cord fabric and the steel wire outside the first steel wire layer in sequence, so that an intermediate buffer layer is arranged between adjacent layers of the steel wire. Wherein, wrapping 4-10 layers of the steel wire or steel wire rope according to pressure requirements, a thickness of the intermediate buffer layer is 0.4-1.2 mm, and a diameter of the steel wire or steel wire rope is 0.6-2.4 mm according to a specification of the rubber hose. Through the intermediate buffer layer, the multiple layers of the steel wires can be better bonded to ensure the integrity of the reinforcing layer 4.

S5, wrapping the second buffer layer: wrapping the cord fabric outside the reinforcing layer as a protective layer, which can make the reinforcing layer and the outer rubber layer better adhere together, avoid the separation of the outer rubber layer and the reinforcing layer caused by special reasons, and ensure the integrity of the hose body. Moreover, the second buffer layer, i.e. the cord fabric, is added between the reinforcing layer and the outer rubber layer, which can increase the tension, make the reinforcing layer more compact, and can improve a blasting pressure of the hose body, and also increase the adhesion of the outer rubber layer and the reinforcing layer, prevent the steel wire from blowing when cutting the head of the hose, and improve the production safety.

S6, wrapping the outer rubber layer: wrapping the outer rubber layer with a thickness of 3-5 mm outside the second buffer layer. Wherein, the outer rubber layer adopts a synthetic rubber layer with weather resistance, wear resistance, ozone aging resistance, fire resistance and oil resistance. Meanwhile, one or more layers of the UHMWPE film can also be coated outside the outer rubber layer to improve the ozone resistance and wear resistance of the hose body.

S7, vulcanization: coating one or more layers of water cloth evenly on the hose body with a special cloth coating machine to prevent the rubber hose body from over-expanding at the vulcanization temperature. Performing the vulcanization in a vulcanizing tank at the temperature of 150° C.-155° C. and the pressure of 0.47-0.5 MPa, then keeping the temperature for 140-160 min, and then removing the water cloth after the hose body is cooled to room temperature.

S8, forming: removing the mandrel to obtain an ultra-high pressure acid fracturing hose, lined with UHMWPE, for marine drilling and shale oil drilling.

The following examples are all schemes in which the burst pressure calculated through finite element modeling can reach the highest value. The structural design includes but is not limited to the following schemes. Products with different specifications and pressure grades can be calculated through this method.

Example 1

Take the preparation of a 2-inch 25000 PSI hose as an example (a burst pressure is 2.25 times a working pressure):
coating an UHMWPE film on a clean steel mandrel in a spiral wrapping manner, wherein a thickness of the UHMWPE film is 0.15 mm, and a number of layers wrapped is 12 layers according to requirements; and a thickness of the wrapping is about 1.8-2.0 mm;
coating, using a rubber extruder, an inner rubber on an outside of the wrapped film, and a thickness of the inner rubber is 3 mm;
wrapping a first buffer layer outside the inner rubber layer, a thickness of the first buffer layer is 0.8 mm, and wrapping 2 layers of the first buffer layer in total by wrapping one layer in counter-clockwise direction and wrapping another layer in clockwise direction respectively;
wrapping a middle rubber layer outside the first buffer layer, wherein a thickness of the middle rubber layer is 0.7 mm, and wrapping 1 layer;
winding, by adopting a winding machine linkage for production, 8 layers of steel wire layers in total outside the middle rubber layer, wherein, layer 1-2 is wound with bead steel wires with a diameter of 1.830, surface coated with bronze, and steel wire strength of 1770 MPa, and a total fracture elongation rate is not less than 5%; layer 3-8 is wound with high-strength copper-plated steel wires with a diameter of 2.0, and steel wire strength of 2150 MPa. Wherein, a winding direction of layer 1, 3, 5, and 7 is opposite to that of layer 2, 4, 6, and 8, which is the counter-clockwise direction and the clockwise direction respectively; each the layer of the steel wire is coated with a layer of the middle rubber layer in the same direction as that of steel wire winding, and the thickness of the middle rubber layer is 0.7 mm.

The winding data of 8 steel wire layers is shown in the following table:

| | Number of steel wires, strands | Outer diameter of steel wire layer, mm ±1 | wire stroke, mm ±1 | winding angle, ° | winding density, % |
|---|---|---|---|---|---|
| 1st layer | 70 | 68.2 | 164 | 51.81 | 97.5 |
| 2nd layer | 72 | 72.4 | 170 | 52.52 | 96.1 |
| 3rd layer | 74 | 76.6 | 174 | 53.47 | 95.3 |
| 4th layer | 75 | 80.8 | 174 | 54.95 | 94.8 |
| 5th layer | 76 | 85.0 | 180 | 55.43 | 92.3 |
| 6th layer | 80 | 89.2 | 185 | 56.02 | 93.9 |
| 7th layer | 82 | 93.4 | 186 | 57.11 | 94.5 |
| 8th layer | 82 | 97.6 | 188 | 58.01 | 92.6 | wrapping a second buffer layer outside the last layer of the middle rubber layer, wherein the second buffer layer is formed by wrapping 3 layers of a cord buffer layer with a thickness of 0.8 mm; coating an outer rubber layer outside the second buffer layer by adopting an extruder extrusion mode, and a thickness of the outer rubber layer is 3.5 mm;
spiral wrapping a layer of UHMWPE film with an overlapping width of more than ½ and a thickness of 0.15 mm, outside the outer rubber layer, as a protective layer; and
wrapping 3 layers of water cloth with a overlapping width of ½;
then, putting the wrapped mandrel into a vulcanizing tank for vulcanization, wherein the vulcanization temperature is 150° C.-160° C., the pressure is 0.45-0.55 MPa, and the vulcanization time is 120-160 min; and
after the vulcanization, removing the water cloth and the mandrel, obtaining a finish product of the acid fracturing hose.

According to the prepared hose in the present example, the bursting pressure of the hose can reach more than 57000 PSI, and a measured value is basically consistent with a calculation value of design.

Control Test 1: the only difference from Example 1 was that all steel wire layers were made of bead wires having a diameter of 1.830. The hose prepared in Control Test 1 had a burst pressure of 37500 PSI, which was lower than that of Example 1.

Control Test 2: the only difference from Example 1 was that all steel wire layers were made of high strength copper plated steel wire having a diameter of 2.0. The hose prepared in Control Test 2 had a burst pressure of 49870 PSI, which was lower than that of Example 1.

Control Test 3: the only difference from Example 1 is that all steel wire layers were wound at an equilibrium angle of 54.73°. The hose prepared in Control Test 3 had a burst pressure of 45500 PSI, which is lower than that of Example 1.

Example 2

Take the preparation of a 3-inch 20000 PSI hose as an example (a burst pressure is 2.25 times a working pressure):
coating an UHMWPE film on a clean steel mandrel in a spiral wrapping manner, wherein a thickness of the UHMWPE film is 0.15 mm, and a number of layers wrapped is 12 layers according to requirements; and a thickness of the wrapping is about 1.8-2.0 mm;

coating, using a rubber extruder, an inner rubber on an outside of the wrapped film, and a thickness of the inner rubber is 4 mm;

wrapping a first buffer layer outside the inner rubber layer, a thickness of the first buffer layer is 0.8 mm, and wrapping 2 layers of the first buffer layer in total by wrapping one layer in counter-clockwise direction and wrapping another layer in clockwise direction respectively;

wrapping a middle rubber layer outside the first buffer layer, wherein a thickness of the middle rubber layer is 0.7 mm, and wrapping 1 layer;

winding, by adopting a winding machine linkage for production, 8 layers of steel wire layers in total outside the middle rubber layer, wherein, layer 1-2 is wound with bead steel wires with a diameter of 1.830, surface coated with bronze, and steel wire strength of 1770 MPa, and a total fracture elongation rate is not less than 5%; layer 3-8 is wound with high-strength copper-plated steel wires with a diameter of 2.0, and steel wire strength of 2150 MPa. Wherein, a winding direction of layer 1, 3, 5, and 7 is opposite to that of layer 2, 4, 6, and 8, which is the counter-clockwise direction and the clockwise direction respectively; each the layer of the steel wire is coated with a layer of the middle rubber layer in the same direction as that of steel wire winding, and the thickness of the middle rubber layer is 0.7 mm.

The winding data of 8 steel wire layers is shown in the following table:

|  | Number of steel wires, strands | Outer diameter of steel wire layer, mm ±1 | wire stroke, mm ±1 | winding angle, ° | winding density, % |
| --- | --- | --- | --- | --- | --- |
| 1st layer | 88 | 95.6 | 230 | 51.20 | 97.3 |
| 2nd layer | 90 | 100.2 | 236 | 52.57 | 96.1 |
| 3rd layer | 92 | 104.8 | 240 | 53.37 | 94.6 |
| 4th layer | 94 | 109.4 | 246 | 53.89 | 95.5 |
| 5th layer | 76 | 114 | 250 | 54.59 | 94.2 |
| 6th layer | 98 | 118.6 | 254 | 55.25 | 93.9 |
| 7th layer | 100 | 123.2 | 256 | 56.07 | 94.2 |
| 8th layer | 102 | 127.8 | 258 | 57.26 | 94.0 | wrapping a second buffer layer outside the last layer of the middle rubber layer, wherein the second buffer layer is formed by wrapping a cord buffer layer with a thickness of 0.8 mm, and wrapping; coating an outer rubber layer outside the second buffer layer by adopting an extruder extrusion mode, and a thickness of the outer rubber layer is 3.5 mm;

spiral wrapping a layer of UHMWPE film with an overlapping width of more than ½ and a thickness of 0.15 mm, outside the outer rubber layer, as a protective layer; and wrapping 3 layers of water cloth with a overlapping width of ½;

then, putting the wrapped mandrel into a vulcanizing tank for vulcanization, wherein the vulcanization temperature is 150° C.-160° C., the pressure is 0.45-0.55 MPa, and the vulcanization time is 150-180 min; and after the vulcanization, removing the water cloth and the mandrel, obtaining a finish product of the acid fracturing hose.

According to the prepared hose in the present example, the bursting pressure of the hose can reach more than 47900 PSI, and a measured value is basically consistent with a calculation value of design.

Control Test 4: the only difference from Example 2 was that all steel wire layers were made of bead wires having a diameter of 1.830. The hose prepared in Control Test 4 had a burst pressure of 33600 PSI, which was lower than that of Example 2.

Control Test 5: the only difference from Example 2 was that all steel wire layers were made of high strength copper plated steel wire having a diameter of 2.0. The hose prepared in Control Test 5 had a burst pressure of 41800 PSI, which was lower than that of Example 2.

Control Test 6: the only difference from Example 2 is that all steel wire layers were wound at an equilibrium angle of 54.73°. The hose prepared in Control Test 6 had a burst pressure of 38400 PSI, which is lower than that of Example 2.

Example 3

Take the preparation of a 4-inch 15000 PSI hose as an example (a burst pressure is 2.25 times a working pressure):

coating an UHMWPE film on a clean steel mandrel in a spiral wrapping manner, wherein a thickness of the UHMWPE film is 0.15 mm, and a number of layers wrapped is 12 layers according to requirements; and a thickness of the wrapping is about 1.8-2.0 mm;

coating, using a rubber extruder, an inner rubber on an outside of the wrapped film, and a thickness of the inner rubber is 5 mm;

wrapping a first buffer layer outside the inner rubber layer, a thickness of the first buffer layer is 0.8 mm, and wrapping 2 layers of the first buffer layer in total by wrapping one layer in counter-clockwise direction and wrapping another layer in clockwise direction respectively;

wrapping a middle rubber layer outside the first buffer layer, wherein a thickness of the middle rubber layer is 0.9 mm, and wrapping 1 layer;

winding, by adopting a winding machine linkage for production, 10 layers of steel wire layers in total outside the middle rubber layer, wherein, layer 1-4 is wound with bead steel wires with a diameter of 1.830, surface coated with bronze, and steel wire strength of 1770 MPa, and a total fracture elongation rate is not less than 5%; layer 3-8 is wound with high-strength copper-plated steel wires with a diameter of 2.0, and steel wire strength of 2150 MPa. Wherein, a winding direction of layer 1, 3, 5, 7, and 9 is opposite to that of layer 2, 4, 6, 8, and 10, which is the counter-clockwise direction and the clockwise direction respectively; each the layer of the steel wire is coated with a layer of the middle rubber layer in the same direction as that of steel wire winding, and the thickness of the middle rubber layer is 0.9 mm.

The winding data of 10 steel wire layers is shown in the following table:

|  | Number of steel wires, strands | Outer diameter of steel wire layer, mm ±1 | wire stroke, mm ±1 | winding angle, ° | winding density, % |
| --- | --- | --- | --- | --- | --- |
| 1st layer | 116 | 123.6 | 300 | 51.84 | 98.3 |
| 2nd layer | 118 | 128.2 | 305 | 52.42 | 97.6 |

-continued

| | Number of steel wires, strands | Outer diameter of steel wire layer, mm ±1 | wire stroke, mm ±1 | winding angle, ° | winding density, % |
|---|---|---|---|---|---|
| $3^{rd}$ layer | 120 | 132.8 | 310 | 52.95 | 97.0 |
| $4^{th}$ layer | 122 | 137.4 | 310 | 53.9 | 97.4 |
| $5^{th}$ layer | 124 | 142.0 | 314 | 54.06 | 97.1 |
| $6^{th}$ layer | 126 | 146.6 | 320 | 54.82 | 96.3 |
| $7^{th}$ layer | 128 | 151.2 | 322 | 55.50 | 96.47 |
| $8^{th}$ layer | 130 | 155.8 | 324 | 56.14 | 96.6 |
| $9^{th}$ layer | 132 | 160.4 | 326 | 56.76 | 96.8 |
| $10^{th}$ layer | 134 | 165 | 328 | 57.35 | 97.0 | wrapping a second buffer layer outside the last layer of the middle rubber layer, wherein using a cord buffer layer having a thickness of 0.8 mm, and wrapping 1-6 layers;

coating an outer rubber layer outside the second buffer layer by adopting an extruder extrusion mode, and a thickness of the outer rubber layer is 3.5 mm;

spiral wrapping a layer of UHMWPE film with an overlapping width of more than ½ and a thickness of 0.15 mm, outside the outer rubber layer, as a protective layer; and wrapping 3 layers of water cloth with a overlapping width of ½;

then, putting the wrapped mandrel into a vulcanizing tank for vulcanization, wherein the vulcanization temperature is 150° C.-160° C., the pressure is 0.45-0.55 MPa, and the vulcanization time is 180-240 min; and after the vulcanization, removing the water cloth and the mandrel, obtaining a finish product of the acid fracturing hose.

According to the prepared hose in the present example, the bursting pressure of the hose can reach more than 36000 PSI, and a measured value is basically consistent with a calculation value of design.

Control Test 7: the only difference from Example 3 was that all steel wire layers were made of bead wires having a diameter of 1.830. The hose prepared in Control Test 7 had a burst pressure of 26250 PSI, which was lower than that of Example 3.

Control Test 8: the only difference from Example 3 was that all steel wire layers were made of high strength copper plated steel wire having a diameter of 2.0. The hose prepared in Control Test 8 had a burst pressure of 31450 PSI, which was lower than that of Example 3.

Control Test 9: the only difference from Example 3 is that all steel wire layers were wound at an equilibrium angle of 54.73°. The hose prepared in Control Test 9 had a burst pressure of 30450 PSI, which is lower than that of Example 3.

Example 4

A formula of an inner rubber layer of a hose of the present example comprises the following components in part by weight: 30 parts of natural rubber, 20 parts of styrene butadiene rubber, 50 parts of cis-polybutadiene, 25 parts of carbon black 234, 35 parts of carbon black 330, 5 parts of activator zinc oxide, 1 part of activator stearic acid, 6 parts of antioxidant RD, 7 parts of graphite, 7 parts of mica powder, 4 parts of adhesive CL-20, 4 parts of tackifier (petroleum tackifying resin), 2 parts of vulcanizing agent (Sulfur) and 2 parts of accelerator CZ.

A preparation method: plasticating the natural rubber one day in advance, putting the plasticated natural rubber, styrene butadiene rubber and cis-polybutadiene into an internal mixer for plasticating for 1 min on the next day, adding zinc oxide, stearic acid, antioxidant, mica powder and graphite powder, mixing for 3 min, adding carbon black and adhesive, mixing for 8 min, wherein during the mixing, the compressed air pressure is controlled at 0.6-1 MPa and temperature is controlled at 100° C.-135° C., then adding the vulcanizing agent and the accelerator in two stages, wherein a temperature of the internal mixer is 80° C.-100° C. during the adding.

Properties of the inner rubber prepared in the present example are as follows: tensile strength is 18-22 MPa, hardness is 60°-65° of Shore A, the elongation at break is 400%-600%, DIN abrasion is 30 mm$^3$, 100° C.*72 h*20% hot air pressure is 32%, excellent comprehensive performance, wear resistance, acid and alkali resistance, and good adhesion with UHMWPE film.

Control Group 10: the only difference from Example 4 was that the mica powder was not added.

Control Group 11: the only difference from Example 4 was that the mica powder and graphite were not added.

Acid resistance test: putting a rubber test piece in 20% hydrochloric acid solution at 23±2° C. after a certain time, then testing a change of a tensile strength of the rubber. When the tensile strength decreased by 20%, an immersion time of the test piece of the formulation of Example 4 was 3 times that of the test piece of the formulation of the Control Group 10.

Abrasion resistance test, carried out according to ISO 4649: under a load of 10 N and running for 40 m, a relative volume abrasion of the inner rubber of Example 4 was 30 mm$^3$, and the relative volume abrasion of the inner rubber of Control Group 11 was about 50 mm$^3$.

Example 5

A formula of an outer rubber layer of a hose of the present example comprises the following components in part by weight: 80 parts of chloroprene rubber, 20 parts of PVC, 4 parts of zinc oxide, 4 parts of magnesium oxide, 1 part of stearic acid, 2 parts of antioxidant ODA (chemical name: 4,4'-dioctyl diphenylamine), 35 parts of carbon black 330, 25 parts of carbon black 550, 1 part of sulfur, 1 part of accelerator NA-22, 1 part of accelerator DM, 22 parts of dioctyl phthalate, 1 part of anti-scorching agent CTP (chemical name: N-cyclohexylthiophthalimide), and 2 parts of calcium zinc stabilizer.

A preparation method:

Step 1, pre-swelling of PVC: putting a certain proportion of the PVC and plasticizer (dioctyl phthalate), and the calcium zinc stabilizer into a stirrer for stirring, the stirring temperature is controlled at 80±10° C., and a stirring time is 30 min;

Step 2, high temperature mixing: putting the swelled PVC and chloroprene rubber into an internal mixer for mixing, wherein, a mixing temperature is 150° C.-160° C., and a mixing time is 2-3 min; then lifting the upper ram of the internal mixer, adding other compounding agents besides vulcanizing agents, such as stearic acid, anti-aging agents, and carbon black into the mixer for mixing 5-8 min; discharging and sheeting the rubber for cooling after forming.

Step 3, adding vulcanizing agent at low temperature: a roller distance is 2-3 mm; adding the vulcanizing agent, and passing the rubber through the rolls with the roller distance less than 2 mm for 2-3 times, then discharging and sheeting the rubber after the rubber is left to thicken to 2-3 mm.

The outer rubber prepared in the present example has the following properties: a shore hardness is 70°-75°, a tensile strength is more than or equal to 13 MPa, an elongation is 250%-350%, 100% tensile stress is more than or equal to 4 MPa, and acid resistance and aging resistance are greatly improved.

Control Group 12: the only difference from Example 5 was that no PVC was added.

For the Example 5: an abrasion resistance test was carried out according to ISO 4649, wherein, under a load of 10 N, and running the outer rubber test piece for 40 m, the relative volume abrasion of the outer rubber was 60 mm$^3$; could reach 3000 h without cracking under a condition of ozone aging resistance of 50 pphm*40° C.; and, at 23±2° C., after being placed in 20% hydrochloric acid solution for 72 h, the tensile strength decreased by 3%, and the elongation at break decreased by 5%.

For the Control Group 12: the abrasion resistance test was carried out according to ISO 4649, wherein, under the load of 10 N was and running the outer rubber test piece for 40 m, the relative volume wear was 100 mm$^3$; cracking occurred within 1000 h under the condition of ozone aging resistance of 50 pphm*40° C.; and, at 23±2° C., after being placed in 20% hydrochloric acid solution for 72 h, the tensile strength decreased by 12%, and the elongation at break decreased by 27%.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. An acid fracturing hose, comprising, sequentially from inside to outside, an inner liner layer, an inner rubber layer, a first buffer layer, a reinforcing layer, a second buffer layer and an outer rubber layer; wherein, the inner liner layer is made of at least one layer of ultra-high molecular weight polyethylene film, the reinforcing layer comprises middle rubber layers and steel wire layers that are arranged at intervals, the inner rubber layer and the outer rubber layer are made of synthetic rubber, and the first buffer layer, the middle rubber layers and the second buffer layer are made of kiss-coating cord fabrics;

wherein the reinforcing layer comprises a plurality of the steel wire layers being divided into steel wire inner layers and steel wire outer layers; wherein, in the acid fracturing hose, a diameter and a strength of steel wires in the steel wire inner layers are lower than those of steel wires in the steel wire outer layers, respectively, and an elongation of the steel wires in the steel wire inner layers is higher than that of the steel wires in the steel wire outer layers; when a hose body expands under pressure, the steel wires of the steel wire inner layers are expanded when the steel wires are pressed, the pressure is sequentially transmitted outwards from a first layer, so that the pressure is transmitted layer by layer to the outer layer;

wherein a winding direction of the steel wires in two adjacent steel wire layers is opposite, and a winding angle of the steel wires in the plurality of the steel wire layers increase sequentially from inside to outside.

2. The acid fracturing hose according to claim 1, wherein the strength of the steel wires in the steel wire inner layers is 1630-2150 MPa and the elongation thereof is not less than 5%; the strength of the steel wires in the steel wire outer layers is 2150-2750 MPa and the elongation thereof is not less than 1.6%.

3. The acid fracturing hose according to claim 1, wherein the steel wire inner layers are 2-6 layers and the steel wire outer layers are 4-10 layers.

4. The acid fracturing hose according to claim 1, wherein a formula of the inner rubber layer comprises the following components in part by weight: 30 parts of natural rubber, 20 parts of styrene butadiene rubber, 50 parts of cis-polybutadiene, 20-30 parts of carbon black 234, 30-40 parts of carbon black 330, 4-6 parts of activator zinc oxide, 1-2 parts of activator stearic acid, 4-8 parts of antioxidant, 5-10 parts of graphite, 5-10 parts of mica powder, 3-5 parts of adhesive CL-20, 3-6 parts of tackifier, 1.5-3 parts of vulcanizing agent, and 2-3 parts of accelerator.

5. The acid fracturing hose according to claim 4, wherein the antioxidant is one or two of 1,2-Dihydro-2,2,4-trimethylquinoline polymer and N-isopropyl-N'-phenylenediamine;

the vulcanizing agent is sulfur; and
the accelerator is one or a combination of more than two of N-cyclohexylbenzothiazole-2-sulphenamide, N-tert-butylbenzothiazole-2-sulphenamide, 2,2'-Dibenzothiazole disulfide, and 4,4'-dithiodimorpholine.

6. The acid fracturing hose according to claim 1, wherein a formula of the outer rubber lay comprises following components in part by weight: 80 parts of chloroprene rubber, 20 parts of polyvinyl chloride, 3-6 parts of zinc oxide, 3-6 parts of magnesium oxide, 0.5-2 parts of stearic acid, 2-3 parts of antioxidant, 30-40 parts of carbon black 330, 20-30 parts of carbon black 550, 0.5-1.5 parts of sulfur, 0.3-1.5 parts of accelerator NA-22 (chemical name: 1,2-ethylene thiourea), 0.5-1.5 parts of accelerator DM (chemical name: 2,2'-Dibenzothiazole disulfide), 15-30 parts of dioctyl phthalate, 0.3-1.5 parts of anti-scorching agent and 1-3 parts of stabilizer.

7. The acid fracturing hose according to claim 6, wherein the anti-scorching agent is N-cyclohexylthiophthalimide; and, the stabilizer is calcium zinc stabilizer.

8. A preparation method of the acid fracturing hose according to claim 1, comprising:

coating, in a spiral wrapping manner, the ultra-high molecular weight polyethylene film on a mandrel, and hot melting the film to form the inner liner layer; and sequentially wrapping, outside the inner liner layer, the inner rubber layer, the first buffer layer, the reinforcing layer, the second buffer layer and the outer rubber layer.

* * * * *